(12) United States Patent
Morgan et al.

(10) Patent No.: US 10,473,038 B2
(45) Date of Patent: Nov. 12, 2019

(54) POWER PLANT THRUST MANAGEMENT SYSTEM FOR TURBOPROP ENGINES

(71) Applicant: PRATT & WHITNEY CANADA CORP., Longueuil (CA)

(72) Inventors: Keith Morgan, Westmount (CA); Ghislain Plante, Verdun (CA); Tania Fauchon, Saint-Lambert (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 191 days.

(21) Appl. No.: 15/623,154

(22) Filed: Jun. 14, 2017

(65) Prior Publication Data

US 2018/0112603 A1 Apr. 26, 2018

Related U.S. Application Data

(60) Provisional application No. 62/413,121, filed on Oct. 26, 2016.

(51) Int. Cl.
| | |
|---|---|
| *F02C 9/28* | (2006.01) |
| *B64C 11/30* | (2006.01) |
| *F02C 3/04* | (2006.01) |
| *F02C 6/20* | (2006.01) |
| *F02C 9/58* | (2006.01) |

(52) U.S. Cl.
CPC ............. *F02C 9/28* (2013.01); *B64C 11/305* (2013.01); *F02C 3/04* (2013.01); *F02C 6/206* (2013.01); *F02C 9/58* (2013.01); *F05D 2220/323* (2013.01); *F05D 2220/326* (2013.01); *F05D 2270/024* (2013.01); *F05D 2270/20* (2013.01); *F05D 2270/303* (2013.01); *F05D 2270/304* (2013.01)

(58) Field of Classification Search
CPC .... F02C 9/28; F02C 9/58; F02C 6/206; F02C 3/04; B64C 11/305; F05D 2220/326; F05D 2270/024; F05D 2220/323; F05D 2270/20; F05D 2270/304; F05D 2270/303
See application file for complete search history.

(56) References Cited

U.S. PATENT DOCUMENTS

| | | |
|---|---|---|
| 4,275,557 A | 6/1981 | Marvin et al. |
| 4,594,849 A | 6/1986 | Kenison et al. |
| 5,133,182 A | 7/1992 | Marcos |

(Continued)

OTHER PUBLICATIONS

European Patent Office, European Search Report, dated Mar. 20, 2018, 8 pages, Application No. 17193892.1.

*Primary Examiner* — Nga X Nguyen
(74) *Attorney, Agent, or Firm* — Norton Rose Fulbright Canada LLP

(57) ABSTRACT

Methods and systems for operating a turboprop engine having a high pressure spool and a low pressure spool rotating independently from one another. Each spool contains at least one compressor stage and the low pressure spool is connected to a propeller. The method comprises determining a target temperature-corrected rotational speed of the low pressure spool for a given set of operating parameters; and controlling a mechanical speed of the low pressure spool to maintain the temperature-corrected rotational speed of the low pressure spool substantially constant throughout at least a portion of a range of a power demand on the turboprop engine.

20 Claims, 6 Drawing Sheets

(56) References Cited

U.S. PATENT DOCUMENTS

| | | | | |
|---|---|---|---|---|
| 5,622,045 | A * | 4/1997 | Weimer | F02C 9/16 |
| | | | | 60/204 |
| 8,459,038 | B1 * | 6/2013 | Lickfold | F02K 3/025 |
| | | | | 60/772 |
| 9,043,118 | B2 | 5/2015 | Healy | |
| 9,441,547 | B2 | 9/2016 | Cai et al. | |
| 9,512,784 | B2 | 12/2016 | Morgan et al. | |
| 9,732,625 | B2 | 8/2017 | Cai | |
| 9,828,869 | B2 * | 11/2017 | Bacic | F01D 11/14 |
| 9,932,120 | B2 | 4/2018 | Fisher et al. | |
| 2010/0000222 | A1 * | 1/2010 | Price | F01D 15/10 |
| | | | | 60/773 |
| 2010/0281875 | A1 * | 11/2010 | Price | F01D 17/162 |
| | | | | 60/772 |
| 2011/0185698 | A1 | 8/2011 | Morgan et al. | |
| 2016/0047392 | A1 | 2/2016 | Bernocchi et al. | |
| 2016/0069277 | A1 | 3/2016 | Meisner et al. | |
| 2016/0229547 | A1 | 8/2016 | Fisher et al. | |
| 2017/0037785 | A1 | 2/2017 | Morgan et al. | |
| 2018/0119628 | A1 | 5/2018 | Zeller et al. | |

\* cited by examiner

POWER PLANT THRUST MANAGEMENT SYSTEM FOR TURBOPROP ENGINES

CROSS-REFERENCE TO RELATED APPLICATIONS

The present application claims the benefit of U.S. Provisional Patent Application No. 62/413,121 filed on Oct. 26, 2016, the contents of which are hereby incorporated in their entirety.

TECHNICAL FIELD

The disclosure relates generally to turboprop engines and, more particularly, to the operation of turboprop engines having a low pressure compressor linked to the propeller.

BACKGROUND OF THE ART

A turboprop engine is a turbine engine that drives an aircraft propeller. Most of the engine's power is used to drive the propeller. The purpose of the propeller is to convert power, delivered by a rotating shaft, into thrust. It does this by accelerating a large mass of air to a higher velocity. The propeller itself is normally operated at a constant speed, with a variable pitch.

The efficiency of a propeller or a compressor is affected by several factors, one of them is the temperature. On cold days, the propeller or the compressor tend to rotate at a higher corrected speed while on hot days, the propeller or the compressor tend to rotate at a lower corrected speed. This causes changes in performance that would be desirable to recoup.

SUMMARY

In one aspect, there is provided a method of operating a turboprop engine having a high pressure spool and a low pressure spool rotating independently from one another. Each spool contains at least one compressor stage and the low pressure spool is connected to a propeller. The method comprises determining a target temperature-corrected rotational speed of the low pressure spool for a given set of operating parameters; and controlling a mechanical speed of the low pressure spool to maintain the temperature-corrected rotational speed of the low pressure spool substantially constant throughout at least a portion of a range of a power demand on the turboprop engine.

In another aspect, there is provided a system for operating a turboprop engine having a high pressure spool and a low pressure spool rotating independently from one another. Each spool contains at least one compressor stage and the low pressure spool is connected to a propeller. The system comprises a processing unit and a non-transitory memory communicatively coupled to the processing unit and comprising computer-readable program instructions. The instructions are executable by the processing unit for determining a target temperature-corrected rotational speed of the low pressure spool for a given set of operating parameters; and controlling a mechanical speed of the low pressure spool to maintain the temperature-corrected rotational speed of the low pressure spool substantially constant throughout at least a portion of a range of a power demand on the turboprop engine.

In a further aspect, there is provided a non-transitory computer-readable medium having stored thereon program code for operating a turboprop engine having a high pressure spool and a low pressure spool rotating independently from one another. Each spool contains at least one compressor stage and the low pressure spool is connected to a propeller. The program code is executable by a processor for determining a target temperature-corrected rotational speed of the low pressure spool for a given set of operating parameters; and controlling a mechanical speed of the low pressure spool to maintain the temperature-corrected rotational speed of the low pressure spool substantially constant throughout at least a portion of a range of a power demand on the turboprop engine.

DESCRIPTION OF THE DRAWINGS

Reference is now made to the accompanying figures in which.

DETAILED DESCRIPTION

There is described herein methods and systems for operating a turboprop engine. In particular, a power shaft including a propeller of a turboprop engine is operated at a variable mechanical speed, in order to maximize the power generated by the engine. This is done to optimize the usage of the low pressure compressor capability.

Figure 1:
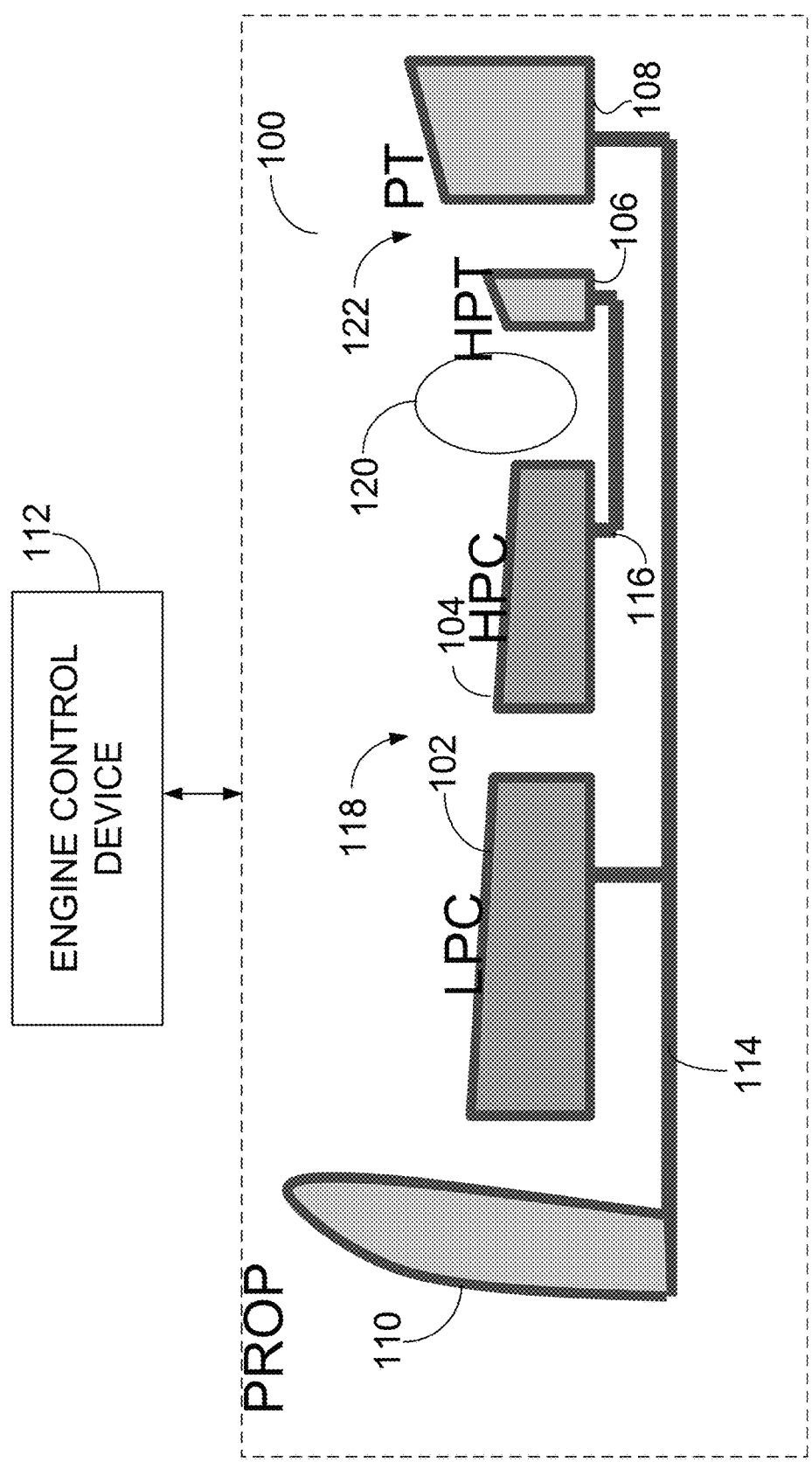
FIG. 1 is a schematic cross-sectional view of an example turboprop engine.

FIG. 1 illustrates a gas turbine engine 100 of a type provided for use in subsonic flight. Engine 100 is a turboprop engine and generally comprises in serial flow communication a propeller 110 through which ambient air is propelled, a compressor section 118 for pressurizing the air, a combustor 120 in which the compressed air is mixed with fuel and ignited for generating an annular stream of hot combustion gases, and a turbine section 122 for extracting energy from the combustion gases. A low pressure spool is composed of a power shaft 114, a low pressure compressor 102, and a low pressure turbine 108. The power shaft 114 drives the propeller 110. A high pressure spool is composed of a high pressure compressor 104 and a high pressure turbine 106 attached to a high pressure shaft 116.

Engine 100 may be geared or ungeared, i.e. a gearbox may or may not be provided between the compressor section 118 and the propeller 110 to drive the propeller 110. Engine 100 may be of a through flow type, where the ambient air enters through the propeller 110, travels through the engine body, and exits at the turbine section 122. In other embodiments, engine 100 may be of a reverse flow type, where the compressor 118 is located at one end of the engine 100 and the propeller 110 is located at the other end, and the turbine 122 is located between the propeller 110 and the compressor 118. In this case, the engine inlet air is ducted from the propeller 110 to the compressor 102. This air travels through the engine body and exits from the turbine 108 through a bifurcated exhaust to have the same flow direction as the pressurized air from the propeller. Propeller 110 may be of a fixed pitch type or a variable pitch type.

Engine 100 is operatively connected to an engine control device 112, configured to command a desired engine power by varying the propeller speed in order to maintain a substantially constant temperature-corrected low pressure compressor speed. Temperature-corrected speed corresponds to mechanical speed divided by a square root of ambient temperature. If temperature changes, then the mechanical speed must vary in order to maintain the temperature-corrected speed constant. The engine control device 112 may be implemented in various manners, such as in software on a processor, on a programmable chip, on an Application Specific Integrated Circuit (ASIC), or as a hardware circuit. In some embodiments, the engine control device 112 is implemented in hardware on a dedicated circuit board located inside an Electronic Engine Controller (EEC) or an Engine Control Unit (ECU). The EEC or ECU may be provided as part of a Full Authority Digital Engine Control (FADEC) of an aircraft. In other embodiments, the engine control device 112 is implemented in a digital processor.

Figure 2:
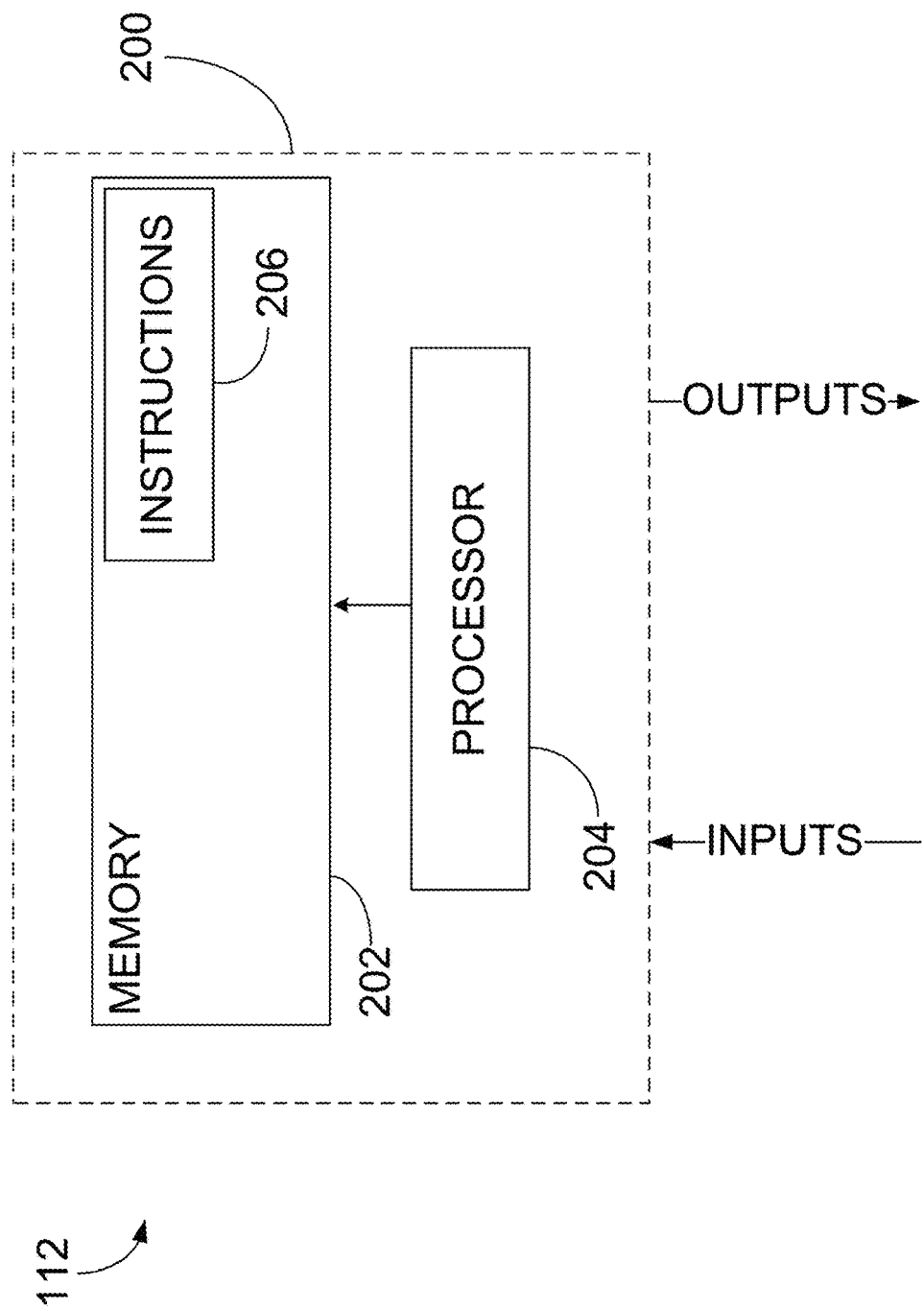
FIG. 2 is a block diagram of an example embodiment of an engine control device.

An example embodiment of the engine control device 112 is illustrated in FIG. 2. A computing device 200 comprises, amongst other things, a processor 204 and a memory 202 which has stored therein computer-executable instructions 206. The processor 204 may comprise any suitable devices configured to cause a series of steps to be performed such that instructions 206, when executed by the computing device 200 or other programmable apparatus, may control various aspects of the operation of engine 100. The processor 204 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 202 may comprise any suitable machine-readable storage medium. The memory 202 may comprise non-transitory computer readable storage medium such as, for example, but not limited to, an electronic, magnetic, optical, electromagnetic, infrared, or semiconductor system, apparatus, or device, or any suitable combination of the foregoing. The memory 202 may include a suitable combination of any type of computer memory that is located either internally or externally to device 200, such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory may comprise any storage means (e.g., devices) suitable for retrievably storing machine-readable instructions executable by processing unit.

The engine control device 112 is configured to maximise the performance of the engine 100, and particularly to extract a maximum amount of power from the low pressure compressor 102. This is done by varying the mechanical speed of the propeller as a function of a current power demand while maintaining a substantially constant temperature-corrected low pressure compressor speed. It should be noted that in the present disclosure, the expression "substantially constant" is used to mean constant or almost constant, whereby a deviation of +1-2% is viewed as almost constant.

Figure 3:
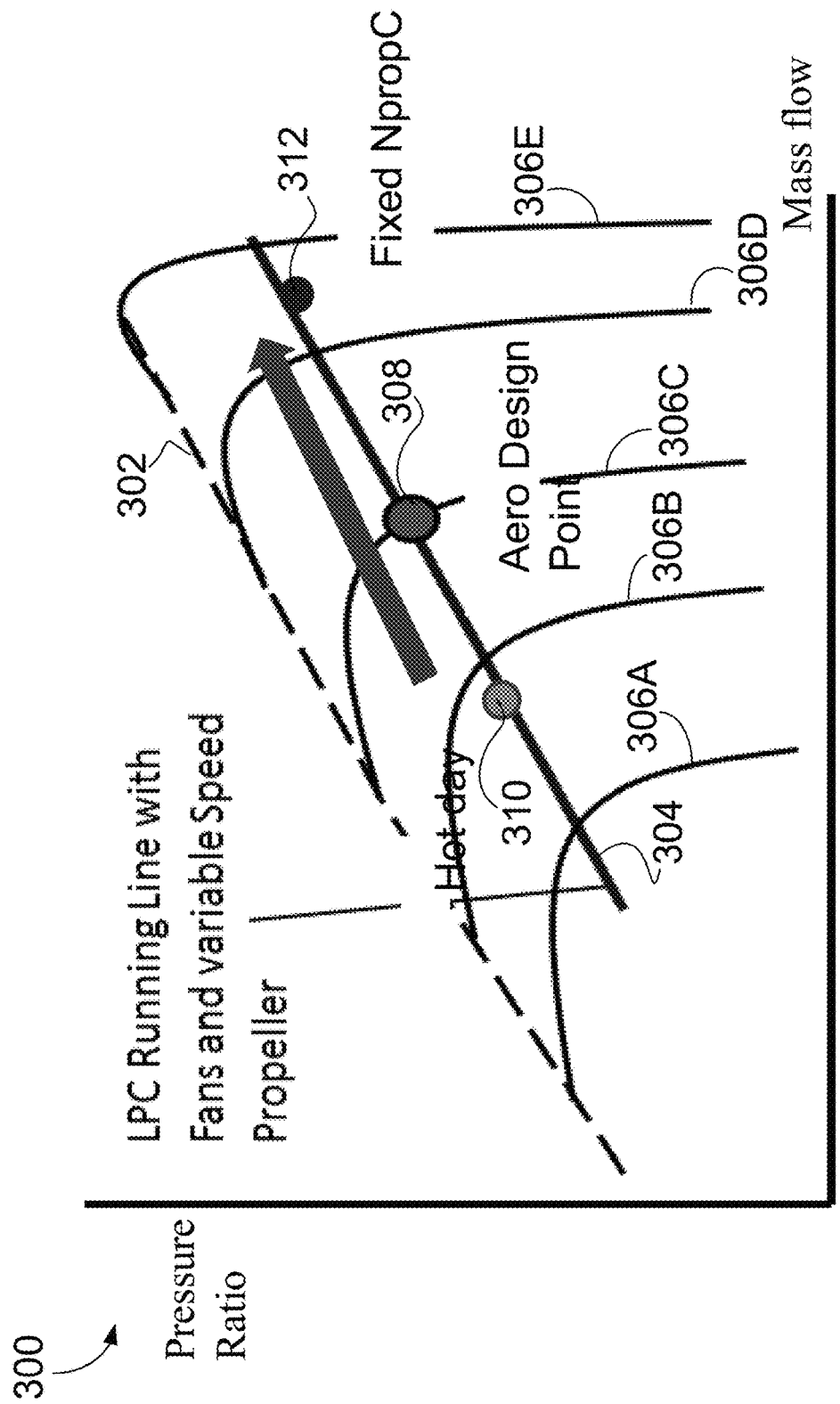
FIG. 3 is an example embodiment of a compressor map.

Referring to FIG. 3, there is illustrated an example compressor map 300. The compressor map 300 is a graph that describes the performance characteristics of a compressor such as low pressure compressor 102, including efficiency and mass flow range. The Y axis represents a pressure ratio (unitless), which is defined as an absolute outlet pressure divided by an absolute inlet pressure:

$$Pressure_{ratio} = \frac{P_{out}}{P_{in}} \quad (1)$$

In equation (1), $P_{out}$ corresponds to the outlet pressure and $P_{in}$ corresponds to the inlet pressure. The X axis of map 300 represents corrected mass flow in lb/min. Generally, the performance of a compressor is defined by the following temperature-corrected (or normalized) parameters:

$$N_{p\_corrected} = \frac{N}{\sqrt{\theta_i}} \quad (2)$$

$$\text{Mass } Flow_{corrected} = \frac{W_i \sqrt{\theta_i}}{\delta_i} \quad (3)$$

where $$\delta_i = \frac{P_{TOTi}}{14.696} \text{ and } \theta_i = \frac{T_{TOTi}}{518.67},$$

i is the inlet to the compressor, N is the mechanical speed of the spool, $w_i$ is the compressor inlet flow, $P_{TOTi}$ is the total pressure at the compressor inlet, $T_{TOTi}$ is the total temperature at the inlet, P is in psi and T is in Rankine degrees. Equation (2) represents a formula for determining the temperature-corrected rotational speed of the low pressure spool. Equation (3) represents a formula for determining the temperature-corrected mass flow.

Surge line 302 is the left hand boundary of the compressor map 300. Operation to the left of surge line 302 represents a region of flow instability. A plurality of speed lines 306a-306e represent the constant rotational corrected speed of the compressor. As turbo speed increases, the pressure ratio increases and/or the mass flow increases.

A running line 304 (also called an operating line or a working line) is shown to intersect the speed lines 306a-306e and corresponds to the various operating points of the engine as it is throttled. Point 308 represents a nominal operation point for which the compressor 102 is designed. Under nominal conditions, the compressor 102 will operate at or around point 308. However, since temperature affects the rotational speed of the compressor 102, on a cold day, the compressor 102 may operate at point 312 while on a hot day the compressor may operate at point 310. When operating the engine 100 with a fixed mechanical propeller speed, the additional power generated by the compressor 102 on a cold day cannot be exploited. Similarly, on a hot day, the compressor generates less power, leading to an inability to exploit the full power capability of the compressor. By operating the propeller 110 at variable mechanical speed (constant corrected speed), it becomes possible to generate additional power on hot days. Temperature variants may be encountered at low altitudes, where additional power may be generated using this technique.

Figure 4:
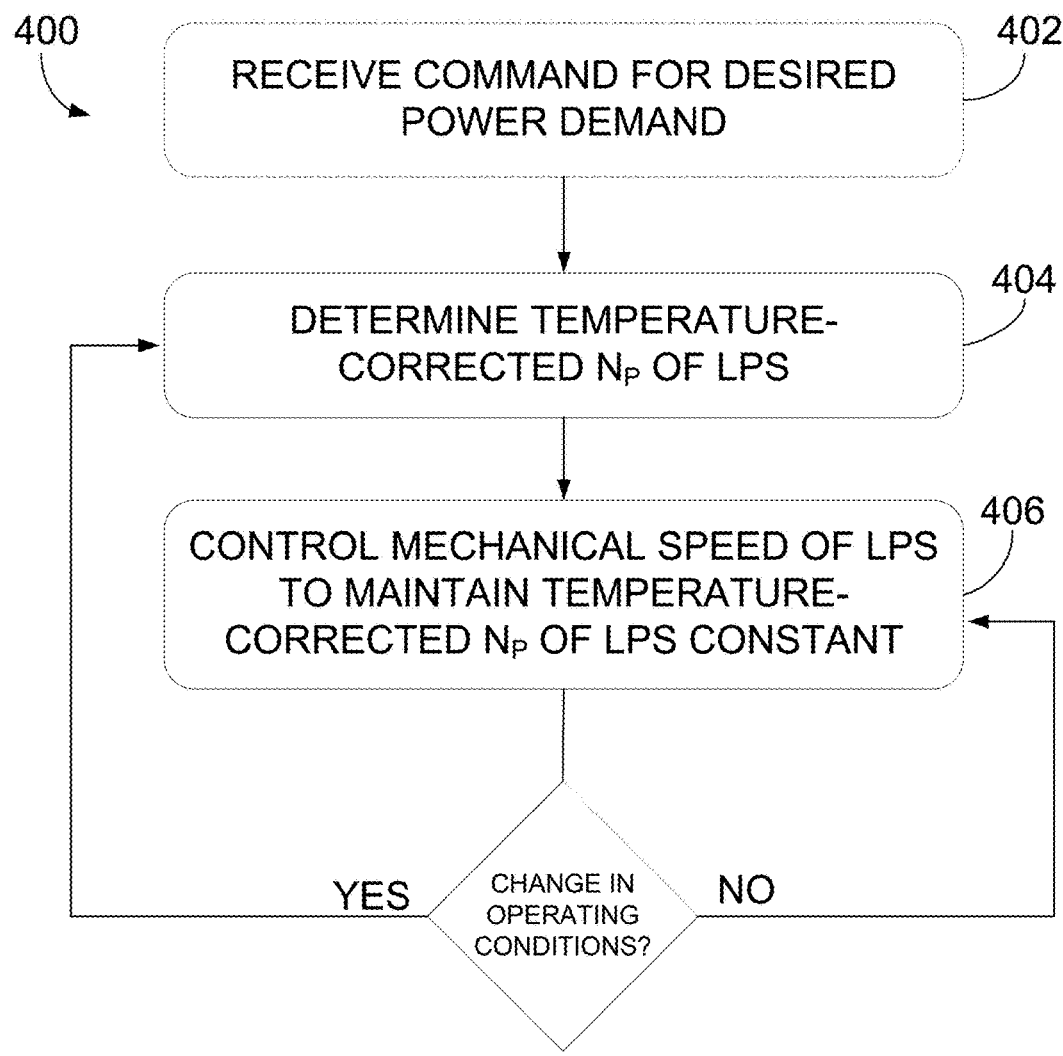
FIG. 4 is a flowchart of an example method for operating a turboprop engine.

Referring to FIG. 4, there is illustrated a method 400 for operating a turboprop engine having an architecture as illustrated in FIG. 1. Specifically, the high pressure spool and the low pressure spool rotate independently from one another and the low pressure spool is connected to the propeller. At 404, a temperature-corrected rotational speed of the low pressure spool is determined for a given set of parameters, such as altitude, Mach speed, and ambient temperature. The ambient temperature may correspond to an air temperature measured outside of the turboprop engine. Note that "outside" of the turboprop engine includes in the general proximity of the engine 100 and/or at an entrance point thereof.

At 406, the mechanical speed of the low pressure spool is controlled to maintain the temperature-corrected speed of the low pressure spool substantially constant throughout at least a portion of a range of a power demand on the turboprop engine. As the temperature-corrected speed is a function of ambient temperature and mechanical speed, the mechanical speed is varied to counter temperature variations in order to maintain a constant temperature-corrected speed.

Figure 5:
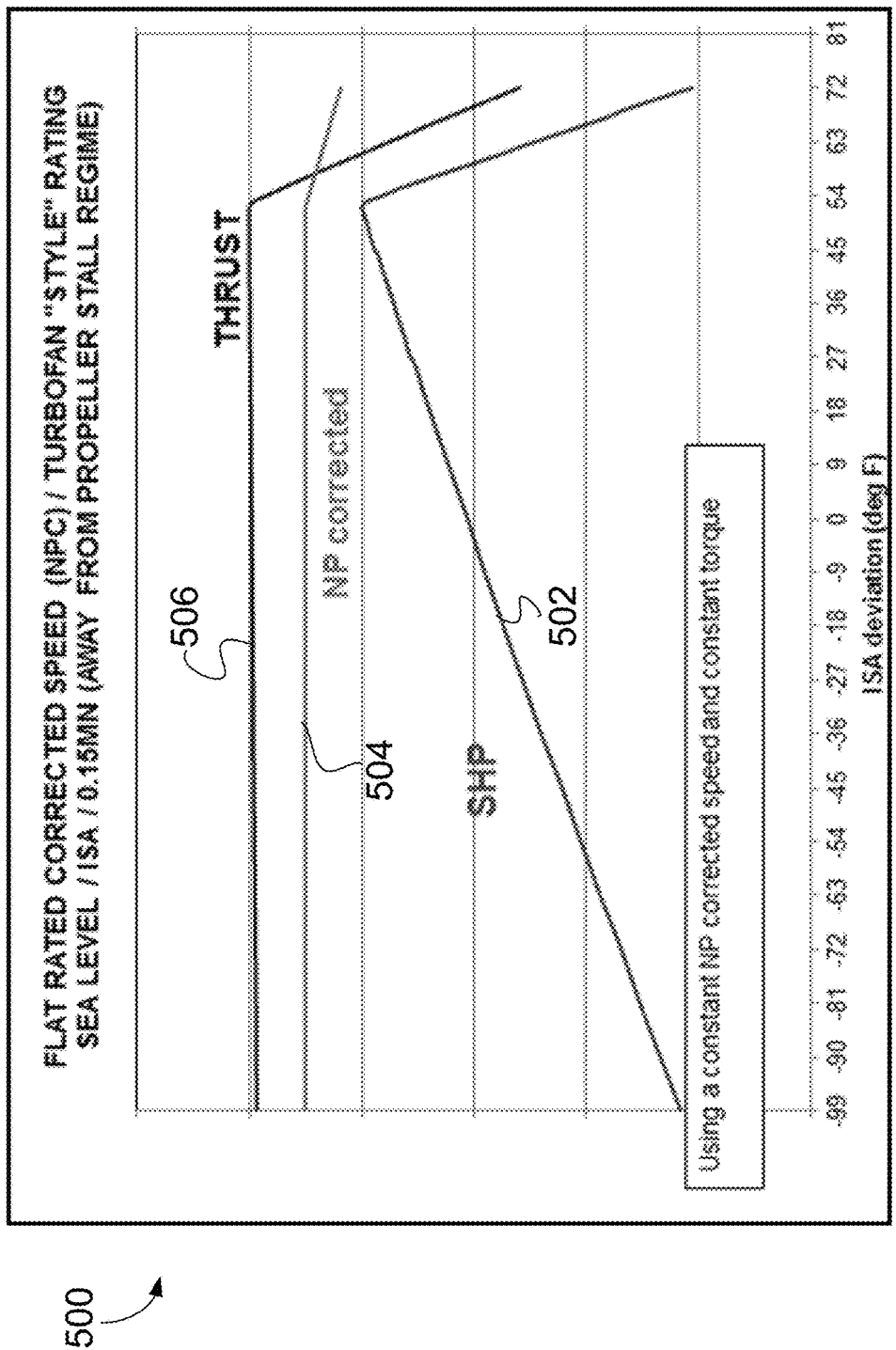
FIG. 5 is a graph with an example mapping of thrust, temperature-corrected rotational speed of a low pressure compressor, and shaft horsepower.

FIG. 5 illustrates a graph 500 showing a constant temperature-corrected rotational speed 504 versus temperature, overlaid with thrust 506 and shaft horsepower 502. As shown, the thrust 506 also remains constant over the same temperature range while the shaft horsepower 502 increases. Air density increases with a lower temperature, which drives an increase in mass flow through the propeller and greater thrust. Reducing the propeller mechanical speed reduces the pressure rise through the propeller, which balances the mass flow increase to maintain a constant thrust, having as consequence that the required shaft horsepower is reduced.

In some embodiments, the power shaft 114 is rotated at a mechanical speed greater than the mechanical speed at the compressor design point. This may happen, for example, when the ambient temperature is hotter and it is desired to operate the compressor 102 higher up on the running line 304 to compensate for the lower temperature-corrected rotational speed due to temperature. Similarly, the low pressure shaft 114 may be rotated at a mechanical speed lower than the mechanical speed at the compressor design point.

Figure 6:
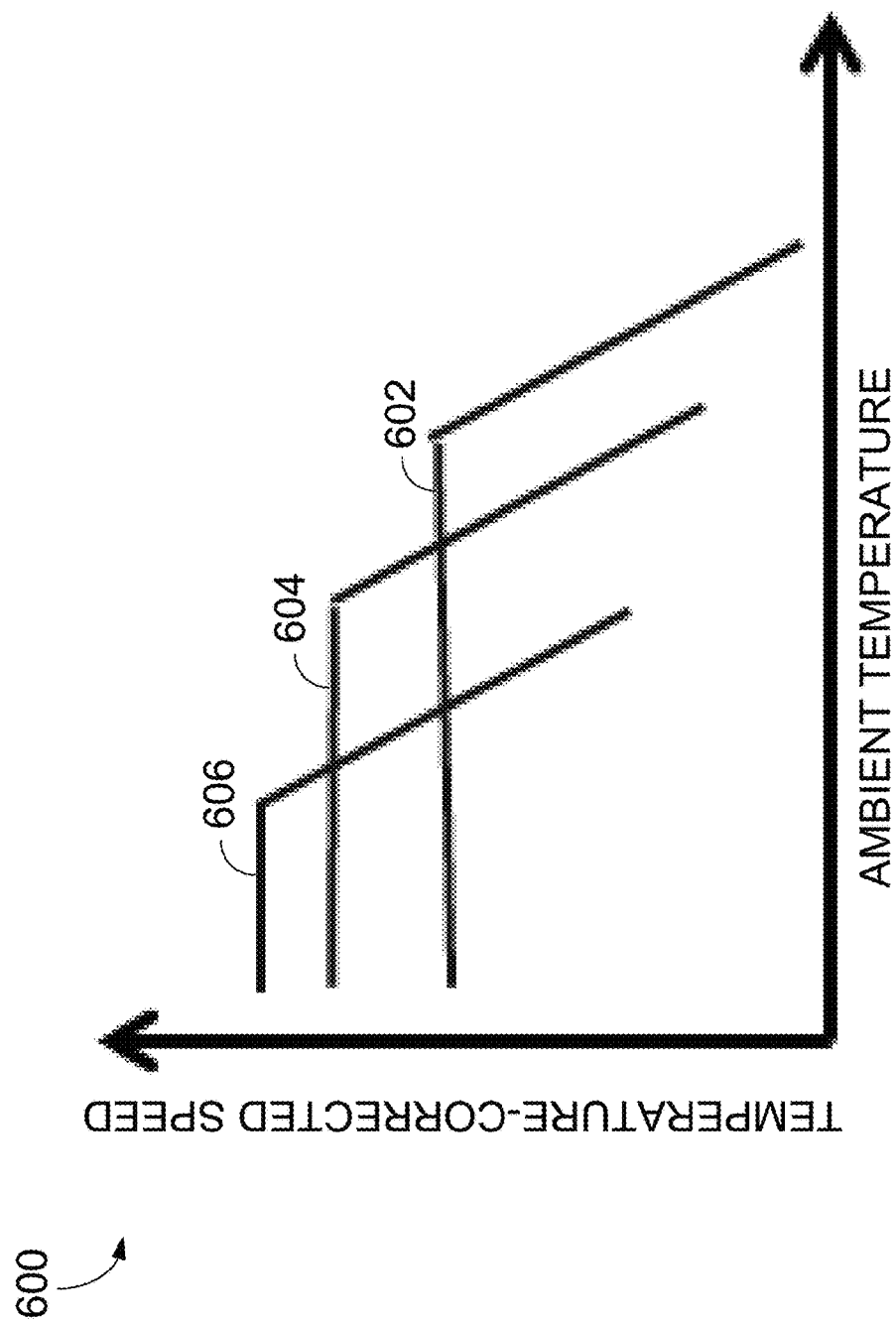
FIG. 6 is a graph showing different temperature-corrected rotational speeds for different altitudes.

In some embodiments, the temperature-corrected rotational speed of the low pressure spool is maintained constant for a given altitude and is changed when the altitude changes. An example of this is shown in the graph 600 of FIG. 6. A first constant speed 606 corresponds to a first altitude, a second constant speed 604 corresponds to a second altitude, and a third constant speed 602 corresponds to a third altitude.

In some embodiments, a dedicated schedule is applied to the low pressure spool so as to have a constant temperature-corrected speed for dedicated time periods while allowing for occasional corrections due to structural and/or aerodynamic factors. For example, a first constant temperature-corrected speed may be applied for a first duration and a second constant temperature-corrected speed for a second duration, with a different temperature-corrected speed in between the first duration and the second duration due to vibrations or instability of the engine 100 or the propeller 110. The first constant temperature-corrected speed and the second constant temperature-corrected speed may be the same or different. The first duration and the second duration may be the same or different. Other embodiments may also apply.

Referring back to FIG. 4, in some embodiments, controlling the mechanical speed of the low pressure compressor comprises modulating the blade pitch of the propeller and/or varying the rotational speed of the power shaft 114. In some embodiments, propeller performance models are used by the engine control device 112 or another device. For example, the model may evaluate propeller efficiency and tip speed for a given set of operating conditions. One or more performance maps may be used to determine the efficiency of the propeller at various combinations of advance ratio and power loading for various altitude conditions. The propeller performance models may be integrated directly with engine control software, such as in the FADEC, the EEC, or any other device used for engine control.

In some embodiments, controlling the mechanical speed of the low pressure compressor comprises modulating a fuel flow to the engine as a function. The engine control device 112 may be configured to send one or more control signals directly to fuel valves for increasing and/or reducing the engine fuel flow. In other embodiments, the control signals are sent to an intermediary unit (not shown), which translates the control signals sent by the engine control device 112 into signals to be sent to the fuel valves.

In some embodiments, method 400 comprises, at 402, receiving a command for a desired power demand. The command may come from a throttle, operated by a pilot in a cockpit of the aircraft. In this case, the temperature-corrected speed of the low pressure compressor is determined as a function of the desired power demand, and the rotational speed of the propeller (and possibly blade pitch) are modulated so as to maintain the temperature-corrected speed constant while generating the desired power. The cockpit of the aircraft may, in some embodiments, be equipped with a single throttle to control thrust demand, instead of two separate levers, one to control propeller pitch and another to control engine fuel flow in order to obtain the required thrust.

The methods and systems for operating a turboprop engine described herein may be implemented in a high level procedural or object oriented programming or scripting language, or a combination thereof, to communicate with or assist in the operation of a computer system, for example the computing device 200. Alternatively, the methods and systems for operating a turboprop engine may be implemented in assembly or machine language. The language may be a compiled or interpreted language. Program code for implementing the methods and systems for operating a turboprop engine may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for operating a turboprop engine may also be considered to be implemented by way of a non-transitory computer-readable storage medium having a computer program stored thereon. The computer program may comprise computer-readable instructions which cause a computer, or more specifically the processor 204 of the computing device 200, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

Various aspects of the methods and systems for operating a turboprop engine may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A method of operating a turboprop engine having a high pressure spool and a low pressure spool rotating independently from one another, each spool containing at least one compressor stage, and the low pressure spool is connected to a propeller, the method comprising:
   determining a target temperature-corrected rotational speed of the low pressure spool for a given set of operating parameters; and
   controlling a mechanical speed of the low pressure spool to maintain the temperature-corrected rotational speed of the low pressure spool substantially constant throughout at least a portion of a range of a power demand on the turboprop engine.

2. The method of claim 1, wherein controlling a mechanical speed of the low pressure spool comprises modulating a rotational speed of the propeller.

3. The method of claim 2, wherein controlling a mechanical speed of the low pressure spool comprises modulating blade pitch of the propeller.

4. The method of claim 1, wherein controlling a mechanical speed of the low pressure spool comprises modulating a fuel flow to the turboprop engine.

5. The method of claim 1, wherein controlling a mechanical speed of the low pressure spool comprises rotating a shaft of the low pressure spool at a speed greater than a compressor design point speed.

6. The method of claim 1, further comprising receiving a command for a desired power demand from a throttle lever, and wherein the given set of operating parameters comprise the desired power demand.

7. The method of claim 1, wherein the given set of operating parameters comprise an aircraft altitude, and wherein a new target temperature-corrected rotational speed is determined when the aircraft altitude changes.

8. The method of claim 1, wherein controlling a mechanical speed of the low pressure spool comprises applying a dedicated schedule having a first temperature-corrected rotational speed for a first duration and at least a second temperature-corrected rotational speed for a second duration.

9. The method of claim 1, further comprising determining that the set of operating conditions have changed, determining a new target temperature-corrected rotational speed of the low pressure spool for a modified set of operating conditions, and controlling the mechanical speed of the low pressure spool to maintain the new target temperature-corrected rotational speed of the low pressure spool substantially constant.

10. A system for operating a turboprop engine having a high pressure spool and a low pressure spool rotating independently from one another, each spool containing at least one compressor stage, and the low pressure spool is connected to a propeller, the system comprising:
   a processing unit; and
   a non-transitory memory communicatively coupled to the processing unit and comprising computer-readable program instructions executable by the processing unit for:
      determining a target temperature-corrected rotational speed of the low pressure spool for a given set of operating parameters; and
      controlling a mechanical speed of the low pressure spool to maintain the temperature-corrected rotational speed of the low pressure spool substantially constant throughout at least a portion of a range of a power demand on the turboprop engine.

11. The system of claim 10, wherein controlling a mechanical speed of the low pressure spool comprises modulating a rotational speed of the propeller.

12. The system of claim 11, wherein controlling a mechanical speed of the low pressure spool comprises modulating blade pitch of the propeller.

13. The system of claim 10, wherein controlling a mechanical speed of the low pressure spool comprises modulating a fuel flow to the turboprop engine.

14. The system of claim 10, wherein controlling a mechanical speed of the low pressure spool comprises rotating a shaft of the low pressure spool at a speed greater than a compressor design point speed.

15. The system of claim 10, wherein the program instructions are further executable for further comprising receiving a command for a desired power demand from a throttle lever, and wherein the given set of operating parameters comprise the desired power demand.

16. The system of claim 10, wherein the given set of operating parameters comprise an aircraft altitude, and wherein a new target temperature-corrected rotational speed is determined when the aircraft altitude changes.

17. The system of claim 10, wherein controlling a mechanical speed of the low pressure spool comprises applying a dedicated schedule having a first temperature-corrected rotational speed for a first duration and at least a second temperature-corrected rotational speed for a second duration.

18. The system of claim 10, wherein the program instructions are further executable for determining that the set of operating conditions have changed, determining a new target temperature-corrected rotational speed of the low pressure spool for a modified set of operating conditions, and controlling the mechanical speed of the low pressure spool to maintain the new target temperature-corrected rotational speed of the low pressure spool substantially constant.

19. The system of claim 10, wherein the processing unit is an engine computer.

20. A non-transitory computer-readable medium having stored thereon program code for operating a turboprop engine having a high pressure spool and a low pressure spool rotating independently from one another, each spool containing at least one compressor stage, and the low pressure spool is connected to a propeller, the program code executable by a processor for:
   determining a target temperature-corrected rotational speed of the low pressure spool for a given set of operating parameters; and
   controlling a mechanical speed of the low pressure spool to maintain the temperature-corrected rotational speed of the low pressure spool substantially constant throughout at least a portion of a range of a power demand on the turboprop engine.

* * * * *